(12) United States Patent
Paik et al.

(10) Patent No.: US 7,817,568 B2
(45) Date of Patent: Oct. 19, 2010

(54) METHOD FOR MEASURING CHARACTERISTICS OF PATH BETWEEN NODES BY USING ACTIVE TESTING PACKETS BASED ON PRIORITY

(75) Inventors: Euihyun Paik, Daejon (KR); Tae-Il Kim, Daejon (KR); Hyeong-Ho Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1145 days.

(21) Appl. No.: 10/841,004

(22) Filed: May 7, 2004

(65) Prior Publication Data
US 2005/0073961 A1    Apr. 7, 2005

(30) Foreign Application Priority Data
Oct. 2, 2003    (KR)    .................. 10-2003-0068775

(51) Int. Cl.
*G01R 31/08*    (2006.01)
(52) U.S. Cl. .................. 370/252; 370/241; 370/242; 370/246; 370/251; 370/400; 370/509; 370/510; 455/502; 375/354; 375/358; 375/363; 375/368
(58) Field of Classification Search ......... 370/241–253, 370/503, 509–512, 519, 400, 408; 455/502; 375/354–370
See application file for complete search history.

(56) References Cited

U.S. PATENT DOCUMENTS

| | | | |
|---|---|---|---|
| 5,682,408 A * | 10/1997 | Tanonaka ................. 375/354 |
| 5,689,688 A * | 11/1997 | Strong et al. ............. 713/375 |
| 5,694,537 A * | 12/1997 | Montenegro et al. ........ 714/12 |
| 5,805,602 A | 9/1998 | Cloutier et al. |
| 5,812,749 A * | 9/1998 | Fernandez et al. .......... 714/4 |
| 5,933,414 A | 8/1999 | Georgiadis et al. |
| 6,094,672 A * | 7/2000 | Willie et al. .............. 709/202 |
| 6,157,957 A * | 12/2000 | Berthaud ................. 709/248 |
| 6,456,597 B1 * | 9/2002 | Bare ....................... 370/252 |
| 6,816,464 B1 * | 11/2004 | Scott et al. ............... 370/252 |
| 6,891,802 B1 * | 5/2005 | Hubbard .................. 370/241 |

(Continued)

FOREIGN PATENT DOCUMENTS

KR    1998-080734    11/1998

(Continued)

*Primary Examiner*—Aung S Moe
*Assistant Examiner*—Christopher P Grey
(74) *Attorney, Agent, or Firm*—Blakely, Sokoloff, Taylor & Zafman LLP

(57) ABSTRACT

Provided are a method for measuring characteristics of a path between nodes by using active testing packets based on priority, i.e., an inter-node path characteristic measuring method, which can measure and provide characteristics of a generated node, when an inter-node data transmission path is generated based on Multi-Protocol Label Switching (MPLS) to provide a path with satisfactory transmission delay, jitter and packet loss that are required by a user, and to provide a computer-readable recording medium for recording a program that implement the method. The method includes the steps of: a) synchronizing system time of the nodes with a global standard time; b) forming each testing packet; c) registering frame sequence and the global standard time during transmission; and d) calculating transmission delay time, jitter and packet loss by using time stamp and packet sequence information of a frame received by the destination node and transmitting the result to the management system.

5 Claims, 3 Drawing Sheets

U.S. PATENT DOCUMENTS

| | | |
|---|---|---|
| 7,330,459 B2 * | 2/2008 | Chen et al. .................. 370/350 |
| 7,542,537 B2 * | 6/2009 | Widera et al. ............... 375/356 |
| 2002/0039371 A1 * | 4/2002 | Hedayat et al. ............. 370/516 |
| 2003/0041274 A1 * | 2/2003 | Platteter et al. ............. 713/400 |
| 2003/0115321 A1 * | 6/2003 | Edmison et al. ............. 709/224 |
| 2006/0239204 A1 * | 10/2006 | Bordonaro et al. .......... 370/253 |

FOREIGN PATENT DOCUMENTS

| | | |
|---|---|---|
| KR | 00257989 | 3/2000 |
| KR | 1020010056954 | 7/2001 |

* cited by examiner

METHOD FOR MEASURING CHARACTERISTICS OF PATH BETWEEN NODES BY USING ACTIVE TESTING PACKETS BASED ON PRIORITY

FIELD OF THE INVENTION

The present invention relates to a method for measuring characteristics of a path between nodes (which is referred to as an inter-node path characteristic measuring method); and, more particularly, to an inter-node path characteristic measuring method using active testing packets based on priority that can measure transmission delay and jitter for inter-node path having diverse priority on a Multi-Protocol Label Switching (MPLS)-based Internet Protocol (IP) network by transmitting testing packets without any hardware assistance and collecting it at a receiving end. The testing packets have priority order and global clock order in an application program. The present invention also relates to a computer-readable recording medium for recording a program that implements the method.

DESCRIPTION OF RELATED ART

In an end-to-end data transmission where data are transmitted between two end points on the Internet, loss characteristic, such as end-to-end delay, delay variations (jitter), and packet loss rate, is very important. Generally, the loss characteristic can be measured in an analytic method based on the characteristics of a network or a simulating method based on end-to-end experiments, and many tools have been developed to measure the loss characteristic.

Followings are conventional analytic methods based on network characteristics. The conventional methods are incorporated herein by reference. First, Korean Patent Laid-Open No. 1999-0049161 published on Mar. 7, 2000 and entitled "Network simulation method for measuring real-time data transmission on the Internet", discloses a method for finding temporal characteristics, such as delay, delay variations and out-of-order packets, packet loss rate, and loss pattern by measuring packet receiving rate and delay rate based on each packet size, when data are transmitted in real-time on the Internet. The packet receiving rate and delay rate are measured by generating traffics through experiments or artificially, transmitting the generated traffics in the same transmission rate, and counting the number of packets received on the receiving part.

Another prior art U.S. Pat. No. 5,933,414 issued on Aug. 3, 1999 and entitled "Method to control jitter in high-speed packet-switched networks" discloses a method for controlling difference in transmission delay time by using a packet scheduling method on a packet-switched IP network.

U.S. Pat. No. 5,805,602 issued on Aug. 3, 1999 and entitled "Method to control jitter in high-speed packet-switched networks" discloses a method of operating a network effectively to control jitter during transmission. According to the method, jitter are controlled by adding time stamp information such as program clock reference (PCR) for controlling jitters in a few bits of a header of a packet, transmitting the packet with time stamp information, calculating time difference between the expected arrival time and actual arrival time in a receiving node by using the packet with time stamp information to compute jitter of a transmitting packet stream, and rerouting a path through which the packet is to pass by using the jitter.

Since it is almost impossible to figure out the characteristics of end-to-end transmission for all cases on the Internet, the above literatures provide analyses based on experiments conducted in several particular hosts. Therefore, the conventional technologies have difficulty in describing the characteristics of end-to-end transmissions required by users reasonably and consistently, because the Internet is expanded and changed rapidly in different network environments at present.

SUMMARY OF THE INVENTION

It is, therefore, an object of the present invention to provide a method for measuring characteristics of a path between nodes by using active testing packets based on priority which can measure and provide characteristics of a generated node, when an inter-node data transmission path is generated based on Multi-Protocol Label Switching (MPLS) and to provide a computer-readable recording medium for recording a program that implement the method.

In accordance with an aspect of the present invention, there is provided a method for measuring characteristics of a path between nodes by using active testing packets based on priority, including the steps of: a) synchronizing system time of the nodes with a global standard time by requesting a management system to send the global standard time periodically; b) forming a testing packet based on information on Internet Protocol (IP) address of a test starting node and a test destination node of the path, priority of the path, size of a testing packet, test starting time, the number of tests, and test period; c) registering frame sequence and the global standard time during transmission based on a predetermined test period and transmitting the frame sequence and the global standard time during transmission to a destination node; and d) calculating transmission delay time, jitter and packet loss by using time stamp and packet sequence information of frames received by the destination node and transmitting the result to the management system.

In accordance with another aspect of the present invention, there is provided a computer-readable recording medium for recording a program that implements an inter-node path characteristic measuring method, including the steps of: a) synchronizing system time of the nodes with a global standard time by requesting a management system to send the global standard time periodically; b) forming testing packets based on information on Internet Protocol (IP) address of a test starting node and a test destination node of the path, priority of the path, size of each testing packet, test starting time, the number of tests, and test period; c) registering frame sequence and the global standard time during transmission based on a predetermined test period and transmitting the frame sequence and the global standard time during transmission to a destination node; and d) calculating transmission delay time, jitter and packet loss by using time stamp and packet sequence information of a frame received by the destination node and transmitting the result to the management system.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
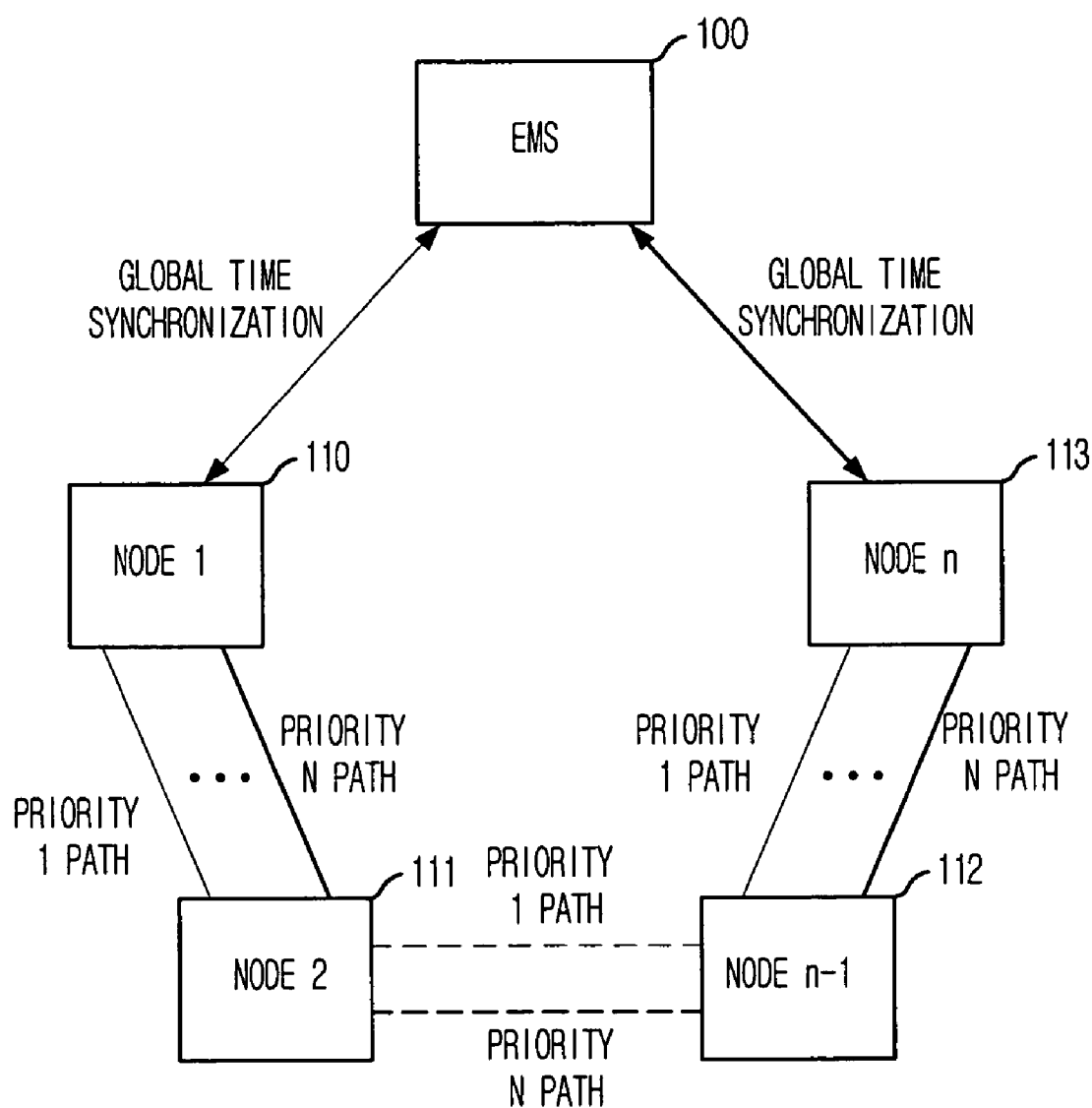
FIG. 1 is a diagram showing a structure of a Multi-Protocol Label Switching (MPLS)-based network to which the present invention is applied.

FIG. 1 is a diagram showing a structure of a Multi-Protocol Label Switching (MPLS)-based network to which the present invention is applied. It shows an element management system (EMS) server connected to each node of a network. The EMS server manages global time.

In the drawing, the reference numeral "100" denotes the EMS and the reference numerals "110 to 113" denote nodes of the network. It is assumed that the EMS performs a function of providing global standard time to the network and the nodes 110 and 113 are ends among the nodes 110 to 113.

Referring to FIG. 1, a method for measuring characteristics of a path between nodes, i.e., inter-node path characteristics measuring method, using an active testing packet based on priority is described hereafter in accordance with the present invention.

First, the time of the EMS 100 is synchronized with the system time of the nodes. Then, a testing packet of a layer 2 (L2) level is formed to measure the transmission delay and jitter for each inter-node path on the MPLS-based network. The testing packet is transmitted to its destination based on a testing period. The transmission delay time, jitter and packet loss are calculated at the destination by using the time stamp and packet sequence information of the received packet and transmitted to the EMS 100.

To be more specific, the two end points, i.e.; the nodes 110 and 113, perform synchronization periodically to match their time with the time of the EMS 100. If a command entry that the transmission delay, packet loss and jitter of a label switch path (LSP) between the two end points 110 and 113 should be measured is within the node 110, a testing packet for testing the LSP is generated and transmitted to the destination, which is the node 113.

When the testing packet is transmitted, priority for the LSP is established in a virtual local area network (VLAN) priority bit of the L2 frame header of the testing packet. Therefore, the testing packet passes through the LSP it means to test.

The node 113, the destination of the testing packet receives the testing packet, compares the packet receiving time with the transmission time stamp, calculates one-directional transmission delay, packet loss, jitter, and transmits the measurement result to the EMS.

Figure 2:
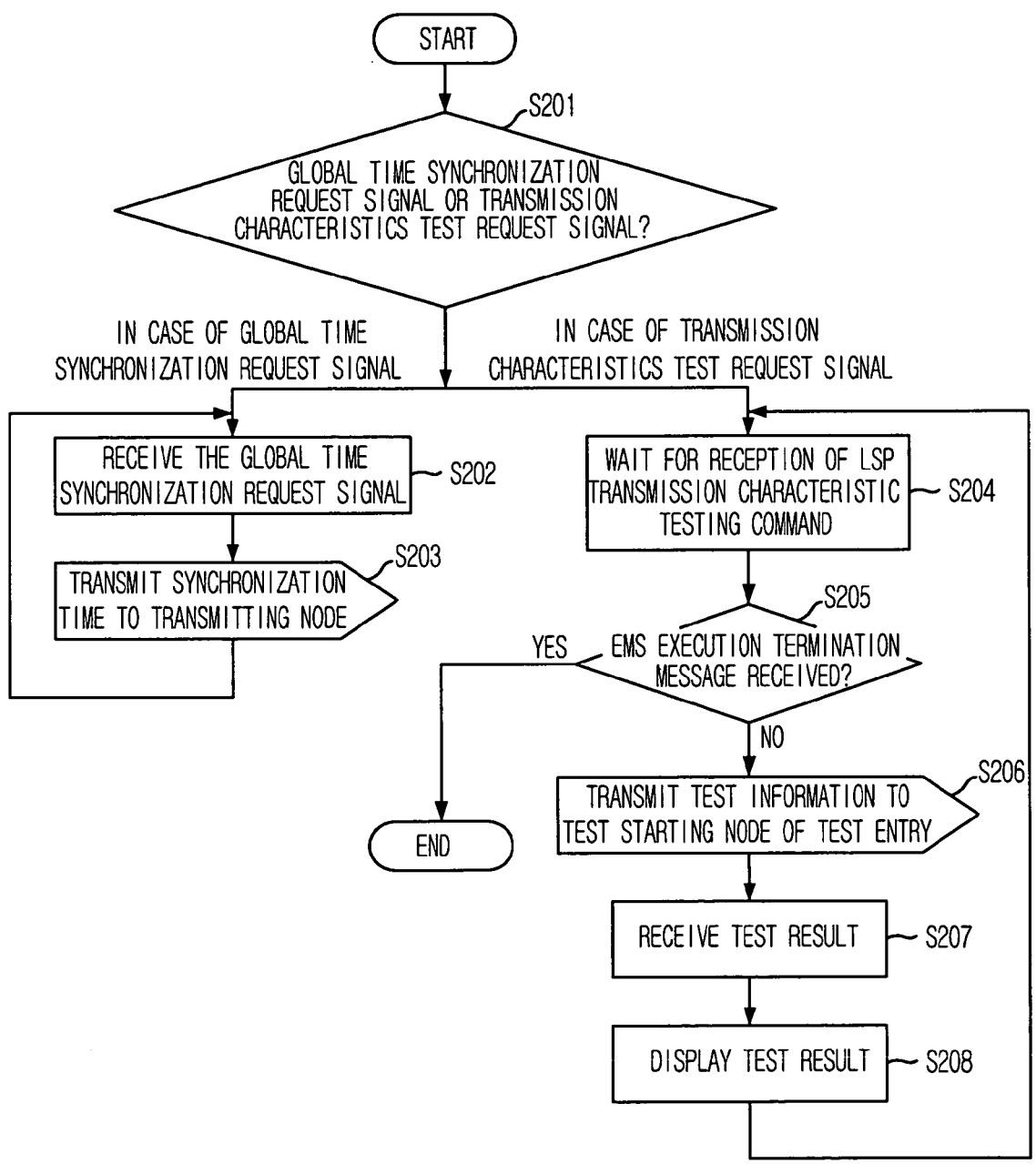
FIG. 2 is a flowchart describing a method for measuring characteristics of a path between nodes, i.e., inter-node path characteristics, using an active testing packet based on priority in accordance with an embodiment of the present invention.

FIG. 2 is a flowchart describing a method for measuring characteristics of a path between nodes, i.e., inter-node path characteristics, using an active testing packet based on priority in accordance with an embodiment of the present invention. It shows a process for requesting to measure the transmission delay and jitter between two nodes that establish an LSP by using a priority-based active testing packet and global time in the EMS and a process for handling the measurement result.

First, at step S201, the EMS waits to receive a global time synchronization request signal or a transmission characteristic test request signal and determines which of them is received.

At step S202, if the EMS waits for the LSP transmission characteristic testing command and receives it, at step S203, the EMS transmits its time to the transmitting node as a synchronization time by carrying it on an acknowledgement message to thereby synchronize the time between the nodes of the IP network.

As a result of the step S201, at step S204, if the EMS waits for a message for testing the transmission characteristics of a particular LSP between two nodes of the IP network from an operator and, at step S205, the EMS receives an EMS execution termination message from the operator, at step S206, it transmits to a test starting node information such as the IP addresses of the two nodes to be tested, characteristics of the LSP to be tested, test starting time, test terminating time, the number of tests, and payload size. Then, at step S207, the test result is received by a test destination node and, at step S208, displayed to an operator.

Figure 3:
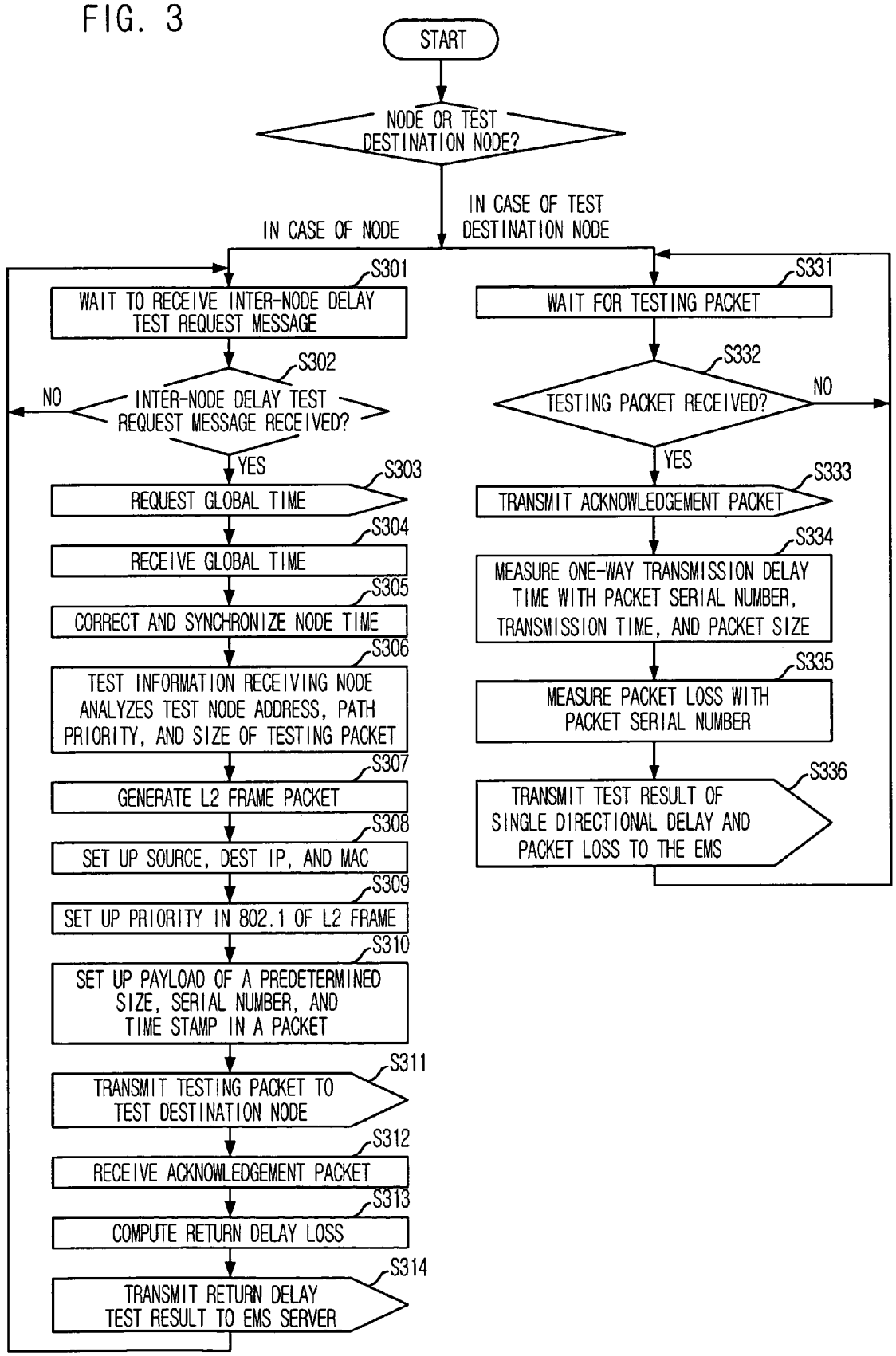
FIG. 3 is a flowchart illustrating the method for using inter-node path characteristics which uses an active testing packet based on priority in accordance with the embodiment of the present invention.

FIG. 3 is a flowchart illustrating the method for using inter-node path characteristics which uses an active testing packet based on priority in accordance with the embodiment of the present invention. It shows a node's process for requesting transmission delay and jitter between two nodes that establish a LSP by using priority-based active testing packet and global time and a process for handling the measurement result.

At step S301, the nodes of the IP network wait for the reception of an inter-node delay testing request message. At step S302, if the message for testing the delay and jitter between the nodes is received by the nodes, at step S303, a standard global time is requested to synchronize the time of the nodes in the IP network with the time of the EMS.

At step S304, the nodes of the IP network receive the global time from the EMS and, at step S305, the nodes correct their time and synchronize the time with the global time. Through this process, each node of the IP network and the EMS have the same time.

At step S306, a testing information receiving node analyzes information on the address of a destination node to be tested, path priority, size of a testing packet, test starting time, test terminating time, the number of tests, and test intervals. Then, at step S307, it generates an L2 testing packet.

Subsequently, at step S308, the Media Access Control (MAC) address of a current node and the MAC address of the next node are established in a corresponding field of the L2 frame of the generated testing packet. At step S309, priority is established in an 802.1p VLAN priority field of the L2 testing packet.

At step S310, payload having a predetermined packet size, packet sequence number and time stamp are established in the testing packet and, at step S311, the testing packet is transmitted to the test destination node.

At step S312, an acknowledgement packet is received from the test destination node and, at step S313, return delay loss is calculated. At step S314, the return delay test result is transmitted to the EMS server.

Meanwhile, at step S331, the test destination node waits for the testing packet and, at step S332, the testing packet arrives at the test destination node, at step S333, the test destination node transmits an acknowledgement packet. At step S334, it measures one-way transmission delay time and jitter by using the arrival time of the testing packet and the information within the testing packet. At step S335, it measures packet loss by using a packet number. At step S336, the measurement result, which is one-directional delay and packet loss, is transmitted to the EMS.

The inter-node path characteristic measuring method of the present invention can be embodied as a program and recorded in a computer-readable recording medium, such as CD-ROM, RAM, ROM, floppy disks, hard disks, and magneto-optical disks.

The technology of the present invention can measure transmission delay, loss and jitter for an LSP having diverse characteristics by generating a testing packet according to the characteristics of the Label Switched Path (LSP) established between two end points and performing a test periodically. Therefore, it is possible to monitor transmission characteristics and pattern of each LSP and verify if a transmission quality required by users is provided. It can be used as a measuring tool for service level agreement (SLA).

While the present invention has been described with respect to certain preferred embodiments, it will be apparent to those skilled in the art that various changes and modifications may be made without departing from the scope of the invention as defined in the following claims.

What is claimed is:

1. A method for measuring characteristics of a path between nodes by using an active testing packet based on priority, comprising the steps of:
   a) synchronizing system time of the nodes with a global standard time by requesting a management system to periodically send the global standard time directly in response to a global time synchronization request signal issued by a transmitting node, the transmitting node to issue the global time synchronization request signal directly in response to an inter-node delay test request message, issued by an operator, for a label switched path (LSP) between a test start node and a test destination node, wherein a snapshot of the global standard time is captured by the management system directly in response to receiving a global time synchronization request signal;
   b) forming, by the test start node, a priority-based testing packet according to an Internet Protocol (IP) address of the test start node and the test destination node of the LSP, a priority of the LSP, a size of the priority-based testing packet, a test starting time, a number of tests, and a test period-subsequent to synchronizing a system time of the test start node and the test destination node with the snapshot of the global standard time;
   c) registering a frame sequence and the global standard time during transmission of the priority-based testing packet based on a predetermined test period and transmitting the frame sequence and the global standard time during transmission of the priority-based testing packet to the test destination node; and
   d) calculating a transmission delay time, jitter and packet loss by using a time stamp and a packet sequence information of a frame of the priority-based testing packet received by the test destination node and transmitting a result to the management system.

2. The method as recited in claim 1, wherein the step b) comprises:
   establishing Media Access Control (MAC) address of a node and MAC address of the next node in a corresponding field of the testing packets, establishing priority in a Virtual Local Area Network (VLAN) priority field, and then establishing a payload of a predetermined packet size, packet sequence number, and time stamp.

3. The method as recited in claim 1, wherein the step d) includes the steps of:
   d1) confirming the reception of the priority-based testing packet, and transmitting an acknowledgement packet to a node;
   d2) measuring single transmission delay time and jitter by using the arrival time of the testing packet and the information within the testing packet and measuring packet loss by using packet number; and
   d3) transmitting the measurement result of the step d) to the management system.

4. A method for measuring characteristics of a path between nodes of an Internet Protocol (IP) network by using active testing packets based on priority, comprising the steps of:
   a) determining whether a signal is a global time synchronization requesting signal, issued by a node, or a transmission characteristic test requesting signal issued from an operator;
   b) if the signal from the node of the IP network is the global time synchronization requesting signal, transmitting a time of a management system to the node as a global synchronization time through an acknowledgement message, wherein a snapshot of the time of the management system is captured by the management system directly in response to receiving a global time synchronization request; and
   c) if the signal is a transmission characteristic test request signal from an operator, transmitting, to a test start node, information on an IP address of the nodes to be tested, characteristics of a Label Switched Path (LSP) to be tested, a test starting time, a test terminating time, a number of tests, and a payload size, a test destination node receiving the test result and displaying a test result to a user to provide a measure of transmission delay and jitter for each inter-node LSP of the IP network, wherein the global time synchronization request signal is issued by a transmitting node, the transmitting node to issue the global time synchronization request signal directly in response to the transmission characteristic test requesting signal issued by the operator.

5. A computer-readable recording medium for recording a program that implements an inter-node path characteristic measuring method, comprising the steps of:
   a) synchronizing system time of the nodes with a global standard time by requesting a management system to periodically send the global standard time directly in response to a global time synchronization request signal issued by a transmitting node, the transmitting node to issue the global time Synchronization request signal directly in response to an inter-node delay test request message, issued by an operator, for a label switched path (LSP) established between a test start node and a test destination node, wherein a snapshot of the global standard time is captured by the management system directly in response to receiving a global time synchronization request signal;
   b) forming, by a test start node, a priority-based testing packet according to an Internet Protocol (IP) address of the test start node and a test destination node of the LSP, a priority of the LSP, a size of each testing packet, a test starting time, a number of tests, and a test period-subsequent to synchronizing a system time of the test start node and the test destination node with the snapshot of the global standard time;
   c) registering a frame sequence and the global standard time during transmission of the priority-based testing packet based on a predetermined test period and transmitting the frame sequence and the global standard time during transmission of the priority-based testing packet to the test destination node; and
   d) calculating transmission delay time, jitter and packet loss by using time stamp and packet sequence information of a frame of the priority-based testing packet received by the test destination node and transmitting the result to the management system.

* * * * *